United States Patent [19]
Wieczorek

[11] Patent Number: 5,716,091
[45] Date of Patent: Feb. 10, 1998

[54] FLIPPER PANEL WITH STORAGE BIN

[75] Inventor: Joseph P. Wieczorek, Madison Heights, Mich.

[73] Assignee: Irvin Automotive Products, Inc., Auburn Hills, Mich.

[21] Appl. No.: 650,344

[22] Filed: May 20, 1996

[51] Int. Cl.⁶ .................................................. B60R 5/04
[52] U.S. Cl. ................................. 296/37.16; 224/275
[58] Field of Search ........................ 296/37.16, 97.23, 296/66, 69, 57.1; 224/42.32, 42.33, 42.34, 275; 49/383

[56] References Cited

U.S. PATENT DOCUMENTS

| | | | |
|---|---|---|---|
| 4,270,790 | 6/1981 | Curotto | 296/37.16 |
| 4,277,097 | 7/1981 | Lalanne | 296/37.16 |
| 4,351,555 | 9/1982 | Hashimoto | 296/37.16 |
| 4,783,113 | 11/1988 | Padlo | 296/136 |
| 5,011,208 | 4/1991 | Lewallen | 296/37.16 |
| 5,039,155 | 8/1991 | Suman et al. | 296/37.15 X |
| 5,257,846 | 11/1993 | Kanai et al. | 296/37.14 |
| 5,299,722 | 4/1994 | Cheney | 224/273 |
| 5,441,183 | 8/1995 | Frenzel | 224/542 |

FOREIGN PATENT DOCUMENTS 6-48252  2/1994  Japan ................................. 224/275

*Primary Examiner*—Joseph D. Pape
*Attorney, Agent, or Firm*—Harness, Dickey & Pierce, PLC

[57] ABSTRACT

A trim panel adapted for mounting in an interior compartment of a motor vehicle behind a seat thereof, the seat having a seat back movable between a generally upright in-use position and a generally horizontal non-use position. The panel includes a generally planar body having opposing sides and opposing ends which is mounted to the interior compartment of the vehicle. This mounting permits movement of the panel between a generally upright position and a generally horizontal position where the panel contacts a rear surface of the seat back. At least one storage compartment is integrally formed with the body and positioned to be located between the body and the seat back.

19 Claims, 1 Drawing Sheet

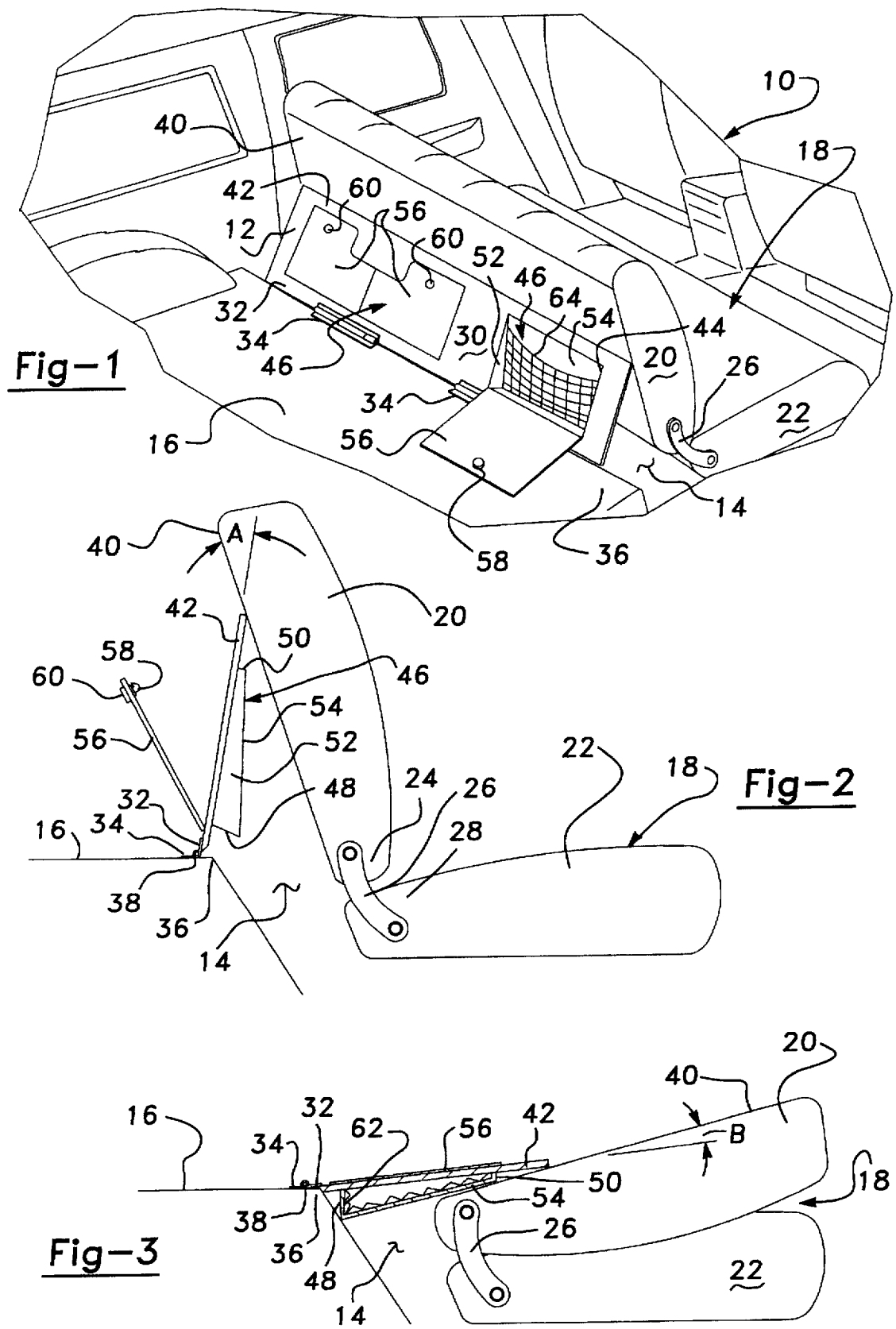

FLIPPER PANEL WITH STORAGE BIN

BACKGROUND OF THE INVENTION

1. Field of the Invention

The present invention generally relates to a trim panel associated with the rear load floor and the rear passenger seat in a motor vehicle. More specifically, the present invention relates to a trim panel of the above mentioned variety, known as a flipper-panel, having an integral storage compartment so as to increase the internal storage capacity of the vehicle.

2. Description of the Prior Art

Sport utility and other vehicles are often provided with a rear seat that includes a seat back that can be folded down, either onto the seat cushion or the vehicle floor. In this folded down position, this seat back forms an extension of the rear load floor to increase the internal cargo area and capacity of the vehicle. With the seat back in either its upright or folded position, a gap is present between the rear load floor and the seat back. Unrestrained articles placed on the rear load floor can therefore fall within this gap during movement of the vehicle.

To prevent articles from falling into the gap, some vehicles have been provided with trim panels generally known as close-out or flipper panels. The panels mount to the rear load floor and rest against the rearmost surface of the seat back. Since the panels extend substantially across the width of the vehicle, they work well for their intended purpose of covering the gap between the seat back and load floor. The panels additionally form a bridge or transition surface over the gap when the seat back is folded down.

As with most vehicles, storage area and compartments are at a premium. Such compartments are typically used to store maps, owners manuals, safety items, gloves, ice scrapers, snow brushes and other equipment. Obviously, there is always a need for additional storage within the vehicle.

In view of the foregoing, it is an object of the present invention to fill that need by providing a flipper panel which incorporates a storage compartment into its design.

Another object of the present invention is to provide a flipper panel storage compartment which allows access into the compartment when the panel is located in either an upright or lowered position.

An additional object of the present invention is to provide a flipper panel storage compartment which operates equally well as a storage compartment in both its upright or lowered position.

SUMMARY OF THE INVENTION

In achieving the above and other objects not specifically mentioned herein, the present invention provides a flipper panel that has at least one storage compartment integrally formed with it. The panel includes a generally planar portion which extends substantially across the entire interior width of the vehicle. This allows the panel to cover the length of the gap between the load floor and the back of the rear seat.

To mount the panel in the vehicle, one side of the panel is hingedly attached adjacent to the leading edge of the load floor. The opposing side of the panel engages the rear surface of the seat back while a torsion spring (or other biasing mechanism) urges the panel in engagement with the seat back.

Formed in the flipper panel are one or more storage compartments. Openings in the panel portion provide access into the storage compartments. Generally, the storage compartment is defined by side walls that extend away from the panel portion in the direction of the seat back. This positions the compartment between the panel portion and the rear surface of the seat back. An end wall interconnects the side walls and defines the floor or rear wall of the compartment. In the preferred embodiment of the present invention, the width of the side walls is varied so that the depth of the compartment decreasingly tapers from its lower side to its upper side. This wedge shape is specifically designed to correspond with the lesser of the two angles defined between the rear surface of the seat back and the panel portion, when in the folded and non-folded positions. It is believed that in most vehicles, this lesser angle will be defined when the seat back is in its folded position. Being determined in this manner, the taper of the compartment allows the upper side of the close-out panel to contact and smoothly transition from the rear load floor to the rear surface of the folded down seat back. As an alternative to the wedge shaped or tapered compartment, the storage compartment can be located in the bridge or lower area of the panel thereby confining the compartment to the gap between the load floor and the folded seat back. Such a positioning of the compartment is advantageous when the seat back folds to a completely horizontal position.

To discourage the contents in the storage compartment from falling out of the compartment when a cover door is opened, in its upright position, the lowermost wall of the storage compartment is oriented to slope downward, toward the front of the vehicle, and away from the opening. In this way, the contents of the storage compartment are always urged toward the floor or rear wall of the storage compartment under the influences of gravity.

If desired, additional features can be incorporated into the flipper panel storage compartment. For example, to securely retain the contents within the compartment, a pouch of elastic cargo netting can be provided. Also, to limit noise resulting from the shifting of the contents in the storage compartment, a noise attenuating lining, such as carpeting, can be provided over the interior of the compartment.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 1 is a partial perspective view of the interior of a motor vehicle having a flipper panel embodying the principles of the present invention;

FIG. 2 is a side elevational view of a flipper panel according to the principles of the present invention and positioned against an upright seat back; and FIG. 3 is a side elevational view, similar to that of FIG. 2, with the flipper panel in a generally horizontal position against a folded down seat back, the flipper panel being shown in section.

DETAILED DESCRIPTION OF THE PREFERRED EMBODIMENT

Referring now in detail to the drawings, shown in FIG. 1 a partial perspective view of the interior of a motor vehicle 10 having incorporated therein a flipper panel 12 (hereinafter just "panel 12") embodying the principles of the present invention. As mentioned above, in a vehicle 10 having a cargo or load area, a gap 14 generally exists between a rear load floor 16 and a rear passenger seat 18. If articles are placed unrestrained in the cargo area, the potential exists that during movement of the vehicle 10 the articles will fall into the gap 14. As can be deduced from both FIGS. 2 and 3, this gap 14 exists both when the seat 18 is in its upright condition (FIG. 2) and in its folded or downward position (FIG. 3).

The above mentioned two positions are determined by the relative position of the seat back 20 to the load floor 16. Generally, the seat back 20 is pivotably mounted at its lower edge 24 through a pivot mechanism 26 to a rear edge 28 of a seat cushion 22. In its upright position, the seat back 20 extends generally upwardly and slightly rearwardly from the rear edge 28 of the seat cushion 22 and the load floor 16. In the downward position, the seat back 20 is generally horizontally oriented and has been pivoted about the pivot mechanism 26 so as to overlay the seat cushion 22.

While the present invention is being described in relation to a general construction of the rear seat, it should be understood that the specifics of the seat 18 construction are only being discussed to provide for a proper understanding of the invention. Accordingly, it should be understood that the present invention will have applicability to any seat construction where the seat back is movable between an upright position and a downward or generally horizontal position.

The panel 12 generally includes a rectangular planar portion 30 whose length is sufficient to allow the panel 12 to extend substantially across the width of the load floor 16. Along one longitudinal side, lower side 32, the planar portion 30 is mounted through one or more hinges 34 adjacent to a forward or leading edge 36 of the load floor 16. Preferably, the hinges 34 are biased by a torsion or other spring 38 so that the panel 12 is urged forward (relative to the vehicle 10) into engagement with a rear surface 40 of the seat back 20. Generally it is the opposing longitudinal side of the planar portion 30, the upper side 42, which engages the rear surface 40 of the seat back 20.

Formed in the planar portion 30 are one or more openings 44 which provide access into storage compartments or bins 46. The storage compartments 46 themselves are integrally formed with the planar portion 30 and extend from the planar portion 30 in the direction of the seat back 20. Defining the storage compartments 46 are four side walls which extend normal from the planar portion 30. These side walls include a lower wall 48, an upper wall 50 and end walls 52. A back wall or floor 54 interconnects the side walls to define the depth of the storage compartment 46.

Preferably, the depth of the storage compartments 46 tapers from the lower wall 48 to the upper wall 50 in an amount that allows the upper side 42 of the panel 12 to lay against the rear surface 40 of the seat back 20 when the seat back 20 is in either its upright position or its folded position. In order for this to be accomplished, the taper exhibited by the storage compartments 46 must approximate or be smaller than the lesser of the two angles defined between the rear surface 40 of the seat and the planar portion 30. As seen in FIGS. 2 and 3, these two angles are respectively designated at A and B.

As illustrated, the lesser of the above two angles is angle B, where the seat back 20 is in its folded position. The taper exhibited by the depth of the storage compartments 46 therefore corresponds to angle B. In forming the taper in the storage compartment 46, the lower wall 48 is provided with a greater width than the upper wall 50 and this causes the back wall 54 to slope relative to the panel portion 30. The side walls 52 are similarly provided with the same slope along the edge where they merge with the back wall 54.

With this construction, the storage compartment 46 maximizes the available space between the panel portion 30 and the seat back 20 while still allowing the upper side 42 of panel portion 30 to smoothly transition from the load floor 16 to the rear surface 40 of the seat back 20. Obviously, if the taper exhibited by the storage compartment 46 is greater than the lesser of angles A and B, the upper side 42 of the panel 12 would not rest against the rear surface 40 in one of the seat's two positions. With the present invention, the panel 12 lies flush with the rear surface 40 even though, as illustrated, the seat back 20 does not fold to a completely horizontal position.

Obviously, the shape of the storage compartment could be modified to enable the panel 12 to be used with a completely horizontally folding seat back 20. In such an instance, the folded seat back 20 may be even in height with the load floor 16 and a tapered storage compartment 46 would not allow the panel 12 to lie flush with the seat back 20. To incorporate a storage compartment 46 into the panel 12 while allowing the panel 12 to lie flush with the rear surface 40 of the seat back 20, the compartment 46 is located in the gap bridging area of the panel 12, adjacent to the panel's lower side 32, and confined to the gap 14.

The storage compartments 46 themselves are integrally formed with the panel 12 and as such they may be unitarily formed with the planar portion 30 or independently formed and mounted to fit within the openings in the planar portion 30. In the latter situation, the storage compartment 46 is secured within the openings 44 through any one of the well known securement methods including, without limitation, fasteners, adhesives or welding.

An access door or cover 56 is provided in association with the storage compartments 46. The doors 56 are preferably pivotably mounted along a lower portion of the opening 44 into compartment 46 so that the door 56 opens downwardly toward the load floor 16 when the panel 12 is upright. Each door 56 is provided with a latch mechanism 58 of a well known construction to retain the door 56 closed when access into the storage compartment 46 is not required. To operate the latch 58, a push button or other variety of actuator 60 is provided on the exterior side of the door 56.

The size and shape of the openings 44 into the storage compartments 46 can generally be as desired. For example, in the illustrated embodiment of FIG. 1, the panel 12 is provided with two storage compartments 46, one of which has a length longer than the other, has a non-rectangular shape and which is additionally provided with two access doors 56. Such a long storage compartment 46 might be sized to receive long handled snow brush, umbrella or similarly sized article.

The panel portion 30, compartments 46 and cover doors 56 can be constructed either partially or wholly from a wide variety of materials including rigid plastic or any other similarly suited material.

To enhance the convenience and appeal of the storage compartments 46 to the occupants of the vehicle 10, numerous additional features can be incorporated into storage compartments 46. For example, the interior surfaces of the storage compartment 46 can be lined with a sound attenuating material 62, such as carpeting, felt, or other trim material. In this manner movement of articles within the storage compartments 46 will not result in unpleasant noises being heard by the vehicle occupants. In order to restrain articles from freely moving about within the storage compartments 46, the interior of the compartment 46 can be provided with a pouch 64 formed from a material, such as elastic netting or fabric, strung between the end walls 52 or opposite sides of the back wall 54 of the compartment 46. To discourage the contents in storage compartment 46 from falling out of the compartment when doors 56 are opened, in its upright position, the lower wall 48 of compartment 46 is oriented to slope downward to urge the contents to remain within the storage compartment 46.

While the above description constitutes the preferred embodiment of the present invention, it will be appreciated that the invention is susceptible to modification, variation and change without departing from the proper scope and fair meaning of the accompanying claims.

I claim:

1. A trim panel adapted for mounting in an interior compartment of a motor vehicle and behind a seat thereof, the seat having a seat back being movable between a generally upright in-use position and a generally horizontal non-use position, said trim panel generally extending from said seat back to a load floor in said interior compartment, said panel comprising:

a generally planar portion having opposing sides and opposing ends;

mounting means for mounting said panel to the interior compartment of the vehicle, said mounting means adapted to permit movement of said panel between a generally upright position and a generally horizontal position wherein one side of said planar portion contacts a rear surface of the seat back and the opposite side of said planar portion contacts said lead floor, said panel being in said generally upright position when the seat back is in the in-use position and said panel being in said generally horizontal position when the seat back is in the non-use position; and at least one storage compartment integrally formed with said planar portion, portions of said planar portion defining an opening into said storage compartment, said storage compartment being defined by side walls and a back wall extending between said side walls, said side walls extending from said planar portion and being located about said opening.

2. A trim panel as set forth in claim 1 wherein said storage compartment is defined to one side of said planar portion positioning said storage compartment between said planar portion and the seat back.

3. A trim panel as set forth in claim 1 wherein said side walls of said storage compartment include opposing upper and lower walls and opposing end walls, said upper and lower walls extending from said planar portion in different widths providing said storage compartment with a tapered depth.

4. A trim panel as set forth in claim 3 wherein said tapered depth decreasingly tapers from said lower wall to said upper wall.

5. A trim panel as set forth in claim 1 wherein said storage compartment is generally wedge shaped.

6. A trim panel as set forth in claim 1 wherein said storage compartment has tapered depth.

7. A trim panel as set forth in claim 6 wherein said tapered depth of said storage compartment is at an angle less than a lesser angle defined between said planar portion and said seat back in said generally upright and in-use position thereof or in said generally horizontal and non-use position.

8. A trim panel as set forth in claim 1 further comprising at least one access door being movably mounted to permit access into said storage compartment.

9. A trim panel as set forth in claim 1 wherein said trim panel includes two storage compartments of differing sizes.

10. A trim panel as set forth in claim 1 further comprising a noise attenuating material lining interior surfaces of said storage compartment.

11. A trim panel as set forth in claim 1 further comprising a pouch means for defining a pouch interiorly of said storage compartment.

12. A trim panel as set forth in claim 1 wherein said storage compartment is located adjacent to a lower side of said planar portion.

13. A motor vehicle interior having a rear cargo area including a load floor, said motor vehicle interior comprising:

seat positioned forward of the load floor, said seat having a seat back and a seat cushion, said seat back extending generally upward from and adjacent a rear side of said seat cushion when in an in-use position, said seat back being movable from said in-use position to a generally horizontally extending non-use position;

a generally planar panel having opposing upper and lower sides and opposing ends;

mounting means for mounting said panel such that said lower side is adjacent to the load floor, said mounting means permitting movement of said panel between a generally upright position and a generally horizontal position, said panel being in said upright position and contacting a rear surface of said seat back when said seat back is in said in-use position, said panel being in said generally horizontal position when said seat back is in said non-use position, said panel and said seat back cooperating to define a space therebetween;

at least one storage compartment having side walls and an end wall extending between said side walls, said side walls extending from said panel toward said seat back to locate said storage compartment in said space between said panel and said seat back, portions of said panel defining an opening into said storage compartment; and a door operable for movement between an closed position where said door obstructs said opening and an open position where said door permits access into said storage compartment.

14. A motor vehicle interior as set forth in claim 13 wherein said storage compartment is decreasingly tapered from a lower side wall to an upper side wall thereof.

15. A motor vehicle interior as set forth in claim 14 wherein said storage compartment is decreasingly tapered at an angle being less than or equal to a lesser of an angle defined between said panel in said upright position and said seat back in said in-use position and an angle defined between said panel in said horizontal position and said seat back in said non-use position.

16. A motor vehicle interior as set forth in claim 13 wherein said seat back is generally wedge shaped in vertical cross section.

17. A motor vehicle interior as set forth in claim 13 wherein said side walls extend normal to said panel.

18. A motor vehicle interior as set forth in claim 13 wherein one of said side walls is a lower side wall, said lower side wall extending from said panel at an orientation being generally downward when said panel is in said upright position.

19. A motor vehicle interior as set forth in claim 13 wherein said mounting means urges said panel into contact with said seat back.

\* \* \* \* \*

UNITED STATES PATENT AND TRADEMARK OFFICE
CERTIFICATE OF CORRECTION

PATENT NO. : 5,716,091
DATED : February 10, 1998
INVENTOR(S) : Joseph P. Wieczorek It is certified that error appears in the above-indentified patent and that said Letters Patent is hereby corrected as shown below:

Column 5, Line 32, Claim 1, after "said" delete "lead" and insert --load--.

Column 6, Line 15, Claim 13, before "seat" insert --a--.

Signed and Sealed this

Twenty-eighth Day of April, 1998

BRUCE LEHMAN

*Attest:*

*Attesting Officer*       *Commissioner of Patents and Trademarks*